United States Patent [19]

Smith

[11] Patent Number: 4,525,080

[45] Date of Patent: Jun. 25, 1985

[54] APPARATUS FOR ACCURATELY MEASURING HIGH TEMPERATURES

[75] Inventor: Douglas D. Smith, Knoxville, Tenn.

[73] Assignee: The United States of America as represented by the Department of Energy, Washington, D.C.

[21] Appl. No.: 464,839

[22] Filed: Feb. 8, 1983

[51] Int. Cl.³ ............................................. G01K 3/00
[52] U.S. Cl. .................................... 374/115; 374/121; 374/125
[58] Field of Search ............... 374/125, 135, 131, 141, 374/139, 121

[56] References Cited

U.S. PATENT DOCUMENTS

| | | | |
|---|---|---|---|
| 2,490,617 | 12/1949 | Bristol | 374/121 |
| 2,736,784 | 2/1956 | Gore | 374/141 |
| 3,130,584 | 4/1964 | Kennedy | 374/135 |
| 3,559,485 | 2/1971 | Hovis et al. | 374/125 |
| 4,259,866 | 4/1981 | Sleighter | 374/125 |
| 4,400,097 | 8/1983 | Koschnitzke et al. | 374/121 |
| 4,411,533 | 10/1983 | Loftus et al. | 374/141 |

FOREIGN PATENT DOCUMENTS

| | | | |
|---|---|---|---|
| 54-34285 | 3/1979 | Japan | 374/2 |
| 148552 | 1/1962 | U.S.S.R. | 374/2 |

*Primary Examiner*—Charles Frankfort
*Assistant Examiner*—David R. Schuster
*Attorney, Agent, or Firm*—Earl L. Larcher; Stephen D. Hamel; Judson R. Hightower

[57] ABSTRACT

The present invention is a thermometer used for measuring furnace temperatures in the range of about 1800° to 2700° C. The thermometer comprises a broadband multicolor thermal radiation sensor positioned to be in optical alignment with the end of a blackbody sight tube extending into the furnace. A valve-shutter arrangement is positioned between the radiation sensor and the sight tube and a chamber for containing a charge of high pressure gas is positioned between the valve-shutter arrangement and the radiation sensor. A momentary opening of the valve shutter arrangement allows a pulse of the high gas to purge the sight tube of air-borne thermal radiation contaminants which permits the radiation sensor to accurately measure the thermal radiation emanating from the end of the sight tube.

7 Claims, 1 Drawing Figure

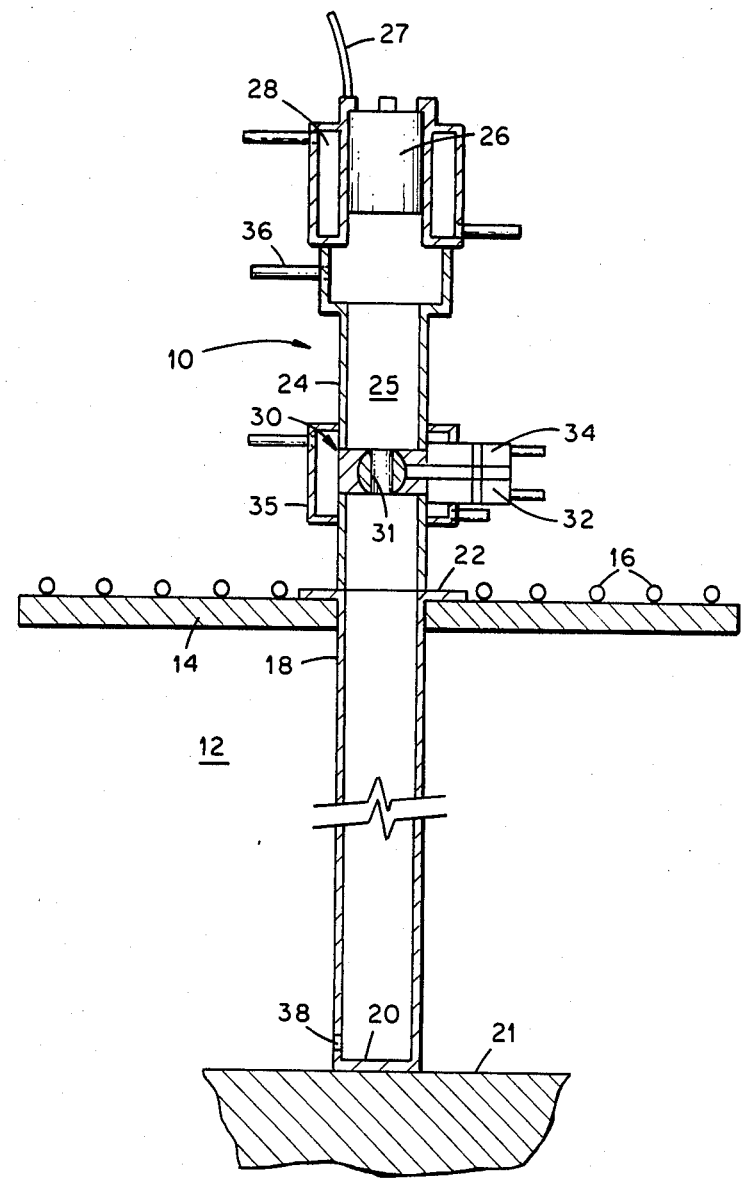

APPARATUS FOR ACCURATELY MEASURING HIGH TEMPERATURES

This invention was made as a result of work under Contract W-7405-ENG-26 with the U.S. Department of Energy.

BACKGROUND OF THE INVENTION

The present invention relates generally to the measurement of high temperatures, and more particularly, to an apparatus for accurately measuring high temperatures in an enclosed environment.

In various metallurgical procedures, high-temperature furnacing often in the range of about 1800° to 2700° C. is required for sintering refractory materials, for achieving the desired alloying, and for affecting the densification and other physical properties desired of the material being treated in the furnace. In order to provide these desired properties of the refractory material being furnaced, the temperature within the furnace must be accurate to within a few degrees of optimum. Thus, accurate and repeatable measurements of the temperature in the furnace must be provided for furnace control in order to achieve satisfactory production of the materials being metallurgically processed in the furnace. For example, inaccurate temperature measurements may lead to furnace temperatures greater than required so as to be catastrophic or deleterious to the materials being treated or alternatively be excessively low so as to fail to provide the material treated with the desired properties. This need for repeatable furnace temperature measurements in the aforementioned temperature range, is believed to be of critical importance in high-temperature metallurgical processes.

Previous experience has shown that optical apparatus for measuring temperatures provide a relatively simple and stable mechanism capable of being relatively easily calibrated so as to provide high sensitivity in the temperature range of about 1800° to 2700° C. required for repeatable temperature measurements in metallurgical furnaces. A typical measurement using optical procedures utilizes a broadband multicolor radiometer which is capable of providing accurate temperature measurements in the aforementioned range since the output from such a radiometer varies as the fourth power of the difference in absolute temperature between the temperature source and the detector. With such an output, the maximum temperature measurement sensitivity is obtained at the higher temperatures so as to make the optical procedure using a broadband radiometer most advantageous for high-temperature measurements. Alternatively, a monochromatic single color radiometer may be utilized for obtaining high-temperature measurements but such a system is of significantly greater cost and does not increase the reliability of the system to a level justifying the increased expenses of using such a system.

While optical temperature measuring systems are satisfactory for obtaining the measurement, some problems occur which detract from the overall efficiency and desirability of the system. In a typical operation of an optical measuring system, the thermal radiation of a blackbody within the furnace is optically measured with this thermal radiation being transmitted along a sight path from the blackbody to a radiometer. Normally, sighting tubes are used for placing the blackbody in optical alignment with the radiometer so that accurate temperature measurements may be achieved. However, when a furnace interior such as a graphite induction furnace is subjected to temperatures greater than about 2,000° C., a considerable quantity of radiation attenuators such as gases, soot, carbon particles, and various impurities emanating from attendant graphite structures cloud the sight path so as to detract from the accuracy of the measurement. Also, since these attenuators are not uniformly emitted, the level of the thermal radiation reaching the sensing device or radiometer varies so as to considerably detract from the efficiency of the temperature sensing system. Efforts to remove these radiation attenuating materials from the sight tube by continually purging the sight tube with a gas have not shown to be practical in that the gas has some cooling effect upon the blackbody and the sighting tube so as to result in inaccurate measurements of the temperature in the furnace.

SUMMARY OF THE INVENTION

Accordingly, it is the primary aim or objective the present invention to provide an optical temperature measuring apparatus for accurately measuring in a repeatable manner the temperatures within a furnace or the like wherein temperatures in the range of about 1800° to 2700° C. are utilized.

Generally, the system or apparatus for achieving accurate temperature measurements in accordance with the present invention, comprises an elongated blackbody sight tube penetrating into a high-temperature environment. A chamber is in registry with the tube at a location external of the high-temperature environment. Thermal radiation sensing means are supported by the chamber at a location remote to the coupling with the tube and disposed in optical alignment with a surface at the distal end of the tube indicative of the temperature in the environment. Conduit means are coupled to the chamber for charging the latter with a high-pressure gas. Valve means are carried by the chamber for normally isolating the interior of the tube from the pressurized gas of the chamber and the thermal radiation sensing means. The valve means are actuatable for effecting the flow of the pressurized gas through the tube to purge the latter of airborne radiation attenuating material prior to the measuring of the temperature at the surface of the distal end of the tube with the thermal radiation sensing means through the opening in the actuated valve.

By cleansing the sight path of the optical thermal radiation sensing device of the air-borne radiation attenuating impurities with the pulse of gas provides for the measurements of the temperatures in less time than required for any significant changes to occur in the radiation sensing device or the blackbody sight tube due to the presence of the purge gas.

Other and further objects of the invention will be obvious upon an understanding of the illustrative embodiment about to be described or will be indicated in the appended claims, and various advantages not referred to herein will occur to one skilled in the art upon employment of the invention in practice.

DESCRIPTION OF THE DRAWINGS

The FIGURE is a somewhat schematic view illustrating the thermometer of the present invention penetrating the sidewall of a high-temperature furnace.

A preferred embodiment of the invention has been chosen for the purpose of illustration and description.

The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

The present invention is directed to a high-temperature measuring apparatus utilizing an optical broadband radiation sensing means which is mounted in a fixture in optical alignment with a closed-end blackbody sighting tube. A valve-shutter assembly is disposed between the optical radiation sensing device and the blackbody sighting tube for sequentially purging the sighting tube of optical attenuating material and for controlling the exposure of the radiation sensing device to thermal radiation emitted from a surface in or near the blackbody sight tube which is indicative of the temperature in the environment surrounding the blackbody sight tube.

More specifically, with reference to the accompanying drawing, the temperature measuring apparatus or thermometer of the present invention is generally shown at 10. The thermometer 10 penetrates into a furnace 12 through a wall 14. Cooling tubes 16 are disposed in or near the furnace wall 14 for maintaining the furnace wall 14 at a selected temperature. The thermometer includes a blackbody sight tube which is normally of a length to diameter ratio of about 20:1 and formed of graphite. A minimum ratio of about 10:1 is required for the blackbody sight tube. The sight tube has the distal or innermost end thereof 20 closed as shown in the drawing. This closed end is preferably disposed in an abutting relationship with the surface of a relatively large heat sink such as a graphite block 21 for providing a thermal radiation emitting surface within the furnace indicative of the furnace temperature. The blackbody sight tube is conveniently positioned in the furnace 12 by a flange arrangement generally shown at 22. Attached to the tube 18 is a additional tube or open cylinder 24 defining a chamber 25 and which is utilized for supporting the radiation temperature sensing device 26 and for containing a gas under high pressure as will be described below.

The radiation sensing device 26 may be of any suitable commercially available type of broadband multi-color radiometer capable of optically sensing thermal radiation. For example, a convenient radiation sensor is sold under the trademark Rayotube, manufactured by Leeds and Northrup Company. The specifications for this sensor include a temperature range 1160° to 2500° C., 0.3 to 4.5 μm bandwidth, 0-24 mV output, time constant 0.015 second, pressure limites 40 psig, and calibrated to ±1% accuracy over its measuring range.

As shown in the drawing, the radiation sensing device 26 is disposed in optical alignment with the closed end 20 of the tube 18 so as to directly sense and measure thermal radiation emanating from the closed end 20 of the tube with this radiation being indicative of temperature of the block 21. The signals derived from the radiation sensor 26 are conveyed via line 27 to a suitable point of use such as a digital voltmeter or other recorder mechanism.

The temperature sensing device is provided with a water-cooled jacket 28 so that the temperature thereof may be readily adjusted by changing the flowrate and/or temperature of the water circulating through the jacket 28. This selective adjustment of the temperature of the radiation sensing device 26 allows for the calibration of the sensing device 26 to correspond to the operation of other temperature sensors such as thermocouples and pyrometers used in the operation of the furnace.

A valve and shutter assembly 30 is carried by the cylinder 24 at a location near the flange 22 so as to provide a volume of adequate capacity in the chamber 25 for containing a sufficient charge of gas for flushing or purging the sight tube 18 as will be described below. The valve and shutter assembly 30 is shown formed of a "ported" ball valve 31 which is rotatable 90° to provide a passageway through the valve for placing the radiation sensing device 26 in optical communication with the closed end 20 of the tube 18 as well as for providing for the flow of the gas from the chamber 25 into the interior of the tube 18. The actuation of the ported ball 31 may be readily achieved by using an electrical solenoid 32 programmed for a suitable sequential operation. To assist the electrical solenoid 31 in actuating the valve, a pneumatic servo 34 may be used.

In order to protect the radiation sensing device 26 from high temperatures from within the furnace during the exposure of the radiation sensing device 26 to the interior of the tube 18 and during the operation of the furnace, the ball valve 30, which provides a substantial heat sink, is provided with a water-cooled cooling jacket 35. By circulating cool water through the jacket 35 the valve 30 is cooled to a temperature which will maintain the temperature of both the gas within the chamber 25 and the optical sensing device 26 within operational parameters.

The chamber 25 is charged with pressurized gas through inlet 36. This gas is a mononuclear gas such as argon or helium. Gases of greater nuclear properties have a tendency to distort thermal radiation readings because of absorption in the infrared and also have larger heat capacity. The purge gas bearing the airborne thermal radiation attenuators is discharged from the distal end of the tube 18 into the furnace 12 through a suitable port or opening 38.

In operation of the thermometer of the present invention, the chamber 25 is charged with argon or helium through line 36. The ball valve 31 is rotated to provide the communication through the ball valve port. The gas from chamber 25 then flows through the valve 31 into tube 18 and out port 38 to purge tube 18 of air-borne thermal radiation attenuators. During this purging, the radiation sensing device 26 is provided with a relatively unobstructed view of the closed end 20 of the sight tube 18 so as to receive thermal radiation emanating therefrom which is indicative of the temperature of the closed end 20 of the tube 18 or the block 21. The sensing of the thermal radiation in the clean sight tube 18 is achieved within about 0.2 seconds so that the temperature measurement may be completed and the ball valve 31 closed before the radiation sensing device or the sight tube 18 is subject to any change in temperature which would negate the accuracy of the reading. Immediately after the temperature reading is taken, the ball valve 31 is closed and the gas cavity or chamber 25 is recharged with gas for another temperature measurement. The repetition rate for this measurement may be at any suitable rate depending upon the metallurgical treatment being achieved in the furnace. This repetition rate can be automatically controlled by the timing of the electrical solenoid 32. Such control may be easily achieved with a microprocessor or the like. The electromotive force (EMF) generated by the radiation sensing device 26, which ranges from about 1 to 24 millivolts, may be recorded by a digital voltmeter with a resolution accuracy of about ±0.01 millivolt. The accuracy of the radiation device is about ±1.0%. Small changes in the calibration of the radiation sensing device 26 may be readily achieved by adjusting the temperature of the gas in the chamber 25 or the water in jacket 28.

While the embodiment shown in the drawing shows the sight tube provided with end of the blackbody sight tube closed, it will appear clear that this closed end 20 may be eliminated from the sight tube so that the optical measurements may be directly derived from the block of graphite 21 disposed in the furnace. In this configuration the terminal end of the tube 18 would be disposed at a location adjacent to the body 21 so that the gas from the chamber 25 may escape from the tube 18 through the space between the end of the tube 18 and the block 21.

It will be seen that the present invention provides a thermometer capable of providing accurate and repeatable temperature readings within a high-temperature furnace that were not heretofore obtainable. The pulse purging of the sight path between the thermal radiation sensing device and the blackbody surface provides for highly accurate temperature readings which eliminates the significant errors in such measurements as caused by the presence of the air-borne thermal radiation attenuating particulates in the blackbody sight tube.

What is claimed is:

1. A temperature sensing device for use in a high-temperature environment comprising:
   an elongated blackbody sight tube penetrating into the environment;
   chamber means coupled to said sight tube at a location external of said environment;
   thermal radiation sensing means supported by said chamber at a location thereon remote to the coupling with the sight tube and in optical alignment with a surface at the distal end of the sight tube innermost within the environment and indicative of the temperature in the environment;
   conduit means coupled to said chamber for charging said chamber with high-pressure gas; and
   valve means carried by said chamber for isolating the interior of the sight tube from the pressurized gas in said chamber and the thermal radiation sensing means, said valve means being sequentially actuatable for effecting the flow of the charge of pressurized gas from said chamber through the sight tube to purge said sight tube of airborne thermal radiation attenuating material prior to measuring the temperature of said surface at the distal end of the sight tube with the thermal radiation sensing means through an opening in the actuated valve and for isolating the interior of the sight tube from said chamber and the thermal radiation sensing means between measurements of the temperature of said surface.

2. A temperature sensing device as claimed in claim 1, wherein said sight tube is closed at said distal end, and wherein an opening through said sight tube is disposed at a location adjacent to the closed end for exhausting the gas bearing the air-borne thermal radiation attenuators from within said sight tube.

3. A temperature sensing device as claimed in claim 2 wherein the closed end of the sight tube is in contact with a surface of a graphite block disposed in the environment.

4. A temperature sensing device as claimed in claim 1, wherein said valve means comprises a ball valve having a passageway therethrough, and wherein valve actuating means are coupled to the ball valve for selectively orienting the passageway for placing the radiation sensing means in optical communication with the distal end of said sight tube through said passageway.

5. A temperature sensing device as claimed in claim 4, wherein said thermal radiation sensing means is a broadband multicolor radiometer, and wherein the temperature being measured in said environment is in the range of about 1800° to 2700° C.

6. A temperature sensing device as claimed in claim 5, wherein heat exchange means are provided for selectively adjusting the temperature of the radiometer.

7. A temperature sensing device as claimed in claim 6, wherein further heat exchange means are provided for selectively adjusting the temperature of said valve means.

* * * * *